United States Patent
Shrader et al.

(10) Patent No.: US 7,299,324 B2
(45) Date of Patent: Nov. 20, 2007

(54) REACTIVE PLACEMENT CONTROLLER FOR INTERFACING WITH BANKED MEMORY STORAGE

(75) Inventors: Steven Shrader, Boise, ID (US); Michael McKeon, Cedar Park, TX (US)

(73) Assignee: Denali Software, Inc., Palo Alto, CA (US)

( * ) Notice: Subject to any disclaimer, the term of this patent is extended or adjusted under 35 U.S.C. 154(b) by 310 days.

(21) Appl. No.: 10/702,916

(22) Filed: Nov. 5, 2003

(65) Prior Publication Data
US 2005/0097265 A1    May 5, 2005

(51) Int. Cl.
*G06F 13/18* (2006.01)
*G06F 12/00* (2006.01)

(52) U.S. Cl. ............................. 711/158; 710/6; 710/40; 711/5

(58) Field of Classification Search ............ None
See application file for complete search history.

(56) References Cited

U.S. PATENT DOCUMENTS

| | | | | |
|---|---|---|---|---|
| 5,276,838 A | * | 1/1994 | Rao et al. | 711/117 |
| 5,822,772 A | * | 10/1998 | Chan et al. | 711/158 |
| 6,564,304 B1 | * | 5/2003 | Van Hook et al. | 711/154 |
| 7,010,654 B2 | * | 3/2006 | Blackmon et al. | 711/158 |

* cited by examiner

*Primary Examiner*—Gary Portka
(74) *Attorney, Agent, or Firm*—Patent Venture Group; Joe A. Brock, II

(57) ABSTRACT

An invention is provided for a reactive placement controller for interfacing with a banked memory storage. The reactive placement controller includes a read/write module, which is coupled to a command control module for a banked memory device. A command queue is included that comprises a plurality of queue entries coupled in series, with a top queue entry coupled to the read/write module. Each queue entry is capable of storing a memory command. Each queue entry includes its own queue control logic that functions to control storage of new memory commands into the command queue to reduce latency of commands in the command queue.

13 Claims, 7 Drawing Sheets

REACTIVE PLACEMENT CONTROLLER FOR INTERFACING WITH BANKED MEMORY STORAGE

CROSS REFERENCE TO RELATED APPLICATIONS

This application is related to 1) U.S. patent application Ser. No. 10/663,328, filed Sep. 16, 2003, and entitled "Method and Apparatus for Multi-Port Memory Controller," and 2) U.S. patent application Ser. No. 10/663,327, filed Sep. 16, 2003, and entitled "Port Independent Data Transaction Interface For Multi-Port Devices," each of which is incorporated herein be reference.

BACKGROUND OF THE INVENTION

1. Field of the Invention

This invention relates generally to memory interfaces, and more particularly to a reactive placement controller for ordering and inserting data transfer commands for banked memory storage.

2. Description of the Related Art

Many memory devices are designed to have a banking nature in order to increase the density of the memory. Unfortunately, the banking nature of the memory devices requires additional cycles to perform setup operations for memory access operations. For example, FIG. 1 is a schematic diagram showing a prior art dynamic random access memory (DRAM) 100. The exemplary DRAM 100 includes a plurality of memory banks 102a-102d, each associated with a page holder 104a-104d.

Each memory bank 102a-102d is divided into a plurality of pages 108a-108b of data. For example, a particular DRAM could store 32 megabits of data in each memory bank 102a-102d. In this case, each memory bank 102a-102d stores about four thousand pages 108a-108b, with each page 108a-108b having about four thousand bits of data.

The DRAM 100 is a very dense memory array, however data access to the DRAM 100 can be slow because of the setup time required to access the memory banks 102a-102d. For example, to access stored data, a request is made for a particular page within a particular memory bank. This request typically takes the form of a row address corresponding to the selected page, and a bank address corresponding to the selected bank. For example, a read request can be received for data stored in page 108a of memory bank 102a. In response, page 108a is transferred to the page holder 104a, which is associated with memory bank 102a. To access particular data within the selected page 108a, a column address is provided that points to the desired data. Each column address points to a segment of data within the selected page that is the width of the DRAM. For example, if the output 106 of the DRAM 100 is sixteen bits, each column address points to sixteen bits of data within the page 108a stored in the page holder 104a. Increased efficiency is obtained by associating a page holder 104a-104d with each memory bank 102a-102d, allowing each memory bank 102a-102d to operate independently.

In a DRAM, such as illustrated in FIG. 1, the worst efficiency occurs when two memory access operations are received for different pages in the same memory bank, as illustrated next in FIG. 2A. FIG. 2A is a timing diagram illustrating a prior art DRAM access of two different pages in the same memory bank. In a first clock cycle 1, the DRAM receives a request for data located on page 108a of memory bank 102a. In this example it is assumed four cycles are required to transfer the requested page from the memory bank to the associated page holder. Thus, in clock cycle 5 a read request can be processed for page holder 104a, which is associated with memory bank 102a and currently stores page 108a. Here, sixty-four bits of data are requested requiring four cycles to complete.

The process of pushing a page from a memory bank to a page holder erases the page data from the memory bank. Hence, when a second page is to be pushed into the same page holder, the first page must be stored back into the memory bank if the data is to be retained. This is referred to as a precharge or refresh. Hence, after the requested data is read, page 108a is stored back into memory bank 102a requiring, in this example, two additional clock cycles. Thereafter, on cycle 12, the request for data located on page 108a' of memory bank 102a can begin processing.

After twelve clock cycles only four sixteen-bit data chunks have been received, which is unacceptable for many systems. To decrease this latency, systems have been developed to "look ahead" in the data stream to more efficiently send requests to the banked memory device. FIG. 2B is a timing diagram illustrating a prior art DRAM access of two different pages in the same memory bank wherein an additional memory access command is inserted to increase data access efficiency. In the example of FIG. 2B, the memory interface has determined that a third request for a page located in memory bank 102b has been received. Since memory banks 102a and 102b can operate independently, memory access can be improved by processing both data requests together. Thus, the request for page 108b in memory bank 102b is inserted in clock cycle 2. As above, it is assume four cycles are required to transfer page 108b from the memory bank 102b to the associated page holder 104b. Although the requested data is available on clock cycle 6, the DRAM output is being utilized in that clock cycle to output the data from page 108a. Thus, the output for page 108b begins after the data for page 108a is read, in clock cycle 10. Now, after twelve clock cycles seven sixteen-bit data chunks have been output from the DRAM, which is improved from FIG. 2A.

FIG. 3 is a schematic diagram showing an exemplary prior art DRAM controller 300 for reordering memory access commands to increase DRAM efficiency. The DRAM controller 300 includes a command input 302, a plurality of queue entries 304 coupled to a multiplexer 308, and a queue control 306 that provides control signals to the multiplexer 308. The multiplexer 308 also is coupled to a read/write control 312, which provides data to a command control 314. In addition, the queue control 306 is coupled to a bank control 310 that also provides data to the command control 314.

As illustrated in FIG. 3, most queues for DRAM controllers are based on a standard circular queue with separate bank control module. In the DRAM controller 300, the queue entries 304 only contain data for an individual command such as address, length, and read/write flag. The queue control module 306 has a direct connection to each queue entry 304 to determine which queue entry data to send to the read/write control module 312. The queue control module 306 selects which command to execute and tells the bank control module 310 to prepare the bank. When the bank is prepared queue control 306 selects the command to be sent to the read/write control module 312.

Unfortunately, the DRAM bank control presents a major problem in the prior art DRAM controller 300. As illustrated in FIG. 2B, commands to the memory to set up banks need to be ahead of the read/write command by a number of cycles. Because of this, the jobs of the queue control 306 and bank control 310 processes are difficult. A command needs to be selected a long time in advance in order to have the bank control module 310 address the bank to the correct address. When the number of banks in the system increases because of the controller 300 being configured for multiple ranks, the problem of bank control goes up exponentially.

The difficulty with the DRAM controller 300 is that as the number of queue entries 304 is expanded the multiplexer 308 to select the number of queue entries 304 also grows. This problem is increased also due to the fact that the multiplexer 308 is muxing a very large number of bits. The address, length, and read/write flag alone typically is about 40 bits. For example, if the number of queue entries 304 is sixteen, the total number of bits to mux is 16*40=640 bits. This large number of bits presents a problem in synthesis. Furthermore, the queue control module 306 adds additional time to the selection process because of the complex task the queue control module 306 performs. That is, selecting the correct command based on the command type and bank status and priority. The timing for the queue control module 306 also increases as the number of queue entries 304 increases.

In view of the foregoing, there is a need for a DRAM controller for ordering and inserting data transfer commands for banked memory storage that avoids exponential increases in complexity as the "look ahead" functionality increases. The DRAM controller should allow a linear progression of complexity as the number of queue entries increases instead of an exponential increase as is experienced in the prior art.

SUMMARY OF THE INVENTION

Broadly speaking, the present invention fills these needs by providing a reactive placement controller for ordering and inserting data transfer commands for banked memory storage. In one embodiment, a reactive placement controller for interfacing with a banked memory storage is disclosed. The reactive placement controller includes a read/write module, which is coupled to a command control module for a banked memory device. A command queue also is included that comprises a plurality of queue entries coupled in series, with a top queue entry coupled to the read/write module. Each queue entry is capable of storing a memory command. Each queue entry includes its own queue control logic that functions to control storage of new memory commands into the command queue to reduce latency of commands in the command queue. In one aspect, the queue control logic for each queue entry can group new inbound commands into brackets, each bracket being a soft division of the command queue based on command data. For example, the queue control logic for each queue entry can group new inbound commands into priority brackets based on a priority value of the command. Within the priority brackets, the queue control logic can group new inbound commands into read/write brackets based on a priority value of the command and a type of the command. Further, within the read/write brackets, read commands can be grouped with read commands and write commands can be grouped with write commands. In addition, the queue control logic for each queue entry can group new inbound commands into bank split brackets based on a priority value of the command, a type of the command, and bank collision proximity to other commands in the command queue.

A method for placing commands within a queue of a placement controller is disclosed in a further embodiment of the present invention. The method includes receiving a new inbound command for a banked memory device, where the new inbound command has an associated priority value, a command type, and an address for the memory. A determination is then made as to whether a priority bracket exists for the priority value of the new inbound command. When a priority bracket exists for the priority value, a determination is made as to whether a read/write bracket exists within the priority bracket for the command type of the new inbound command. Then, when a read/write bracket exists for the command type, a determination is made as to whether the new inbound command addresses a different page in a memory bank addressed by a command in an adjacent queue entry. In one aspect, the new inbound command can be placed within the command queue based on existing priority brackets when a priority bracket does not exist for the priority value of the new inbound command. Also, the current executing command can be interrupted when the priority value of the new inbound command is higher than the priority of the current executing command. When a read/write bracket does not exist within the priority bracket for the command type of the new inbound command, a read/write bracket can be created and the new inbound command can be placed in a queue entry within the priority bracket. Also, the new inbound command generally is placed in a queue entry in the read/write bracket such that the new inbound command is not adjacent to a command addressing a different page in the memory bank addressed by the new inbound command.

A further reactive placement controller for interfacing with a banked memory storage is disclosed in an additional embodiment. The reactive placement controller includes a read/write module coupled to a command control module for a banked memory device. Also, a command queue is included that has a plurality of queue entries coupled in series. As above, the plurality of queue entries includes a top queue entry coupled to the read/write module, and each queue entry is capable of storing a memory command. In addition, each queue entry is coupled to a plurality of priority chains. Each priority chain includes a plurality of AND gates in a chain, and is capable of allowing higher priority queue entries to disable lower priority queue entries. In one aspect, the plurality of priority chains includes a "Priority" priority chain that is controlled by a command priority value of commands. The "Priority" priority chain is capable of disabling queue entries storing commands having a higher priority than a new inbound command. The plurality of priority chains can also include a bank split priority chain that is controlled by an address value of commands. The bank split priority chain is capable of disabling queue entries storing commands causing a bank conflict between adjacent queue entries.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a reactive placement controller for ordering and inserting data transfer commands for banked memory storage. Embodiments of the present invention place queue control logic in each queue entry. Since each queue control logic is only required to examine data bits from itself and adjacent queue entries, embodiments of the present invention allow a linear progression of complexity as the number of queue entries increases instead of an exponential increase as is experienced in the prior art.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 4:
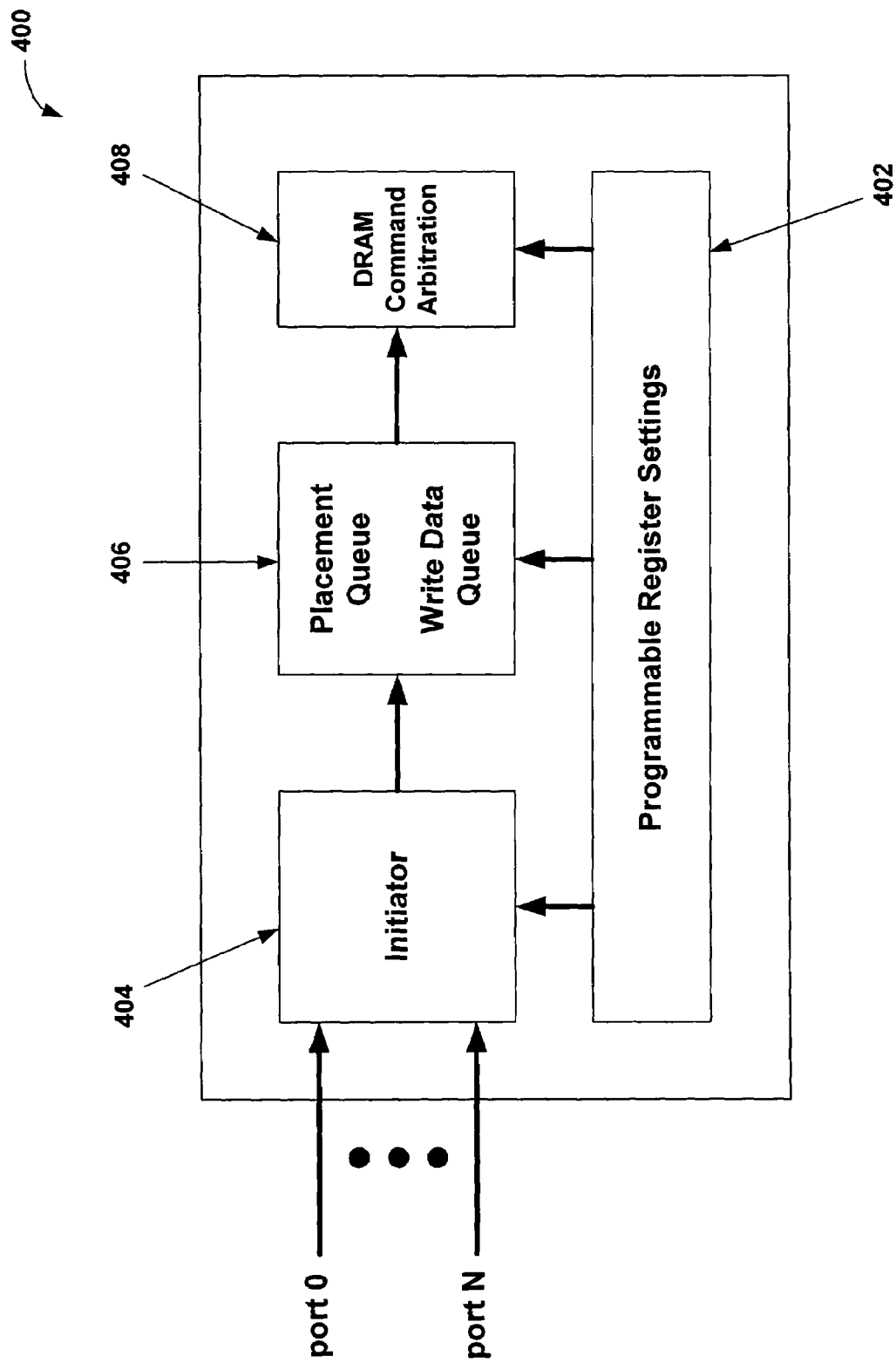
FIG. 4 is a high-level schematic diagram of the components of a multi-port memory controller in accordance with one embodiment of the invention.

In one embodiment, a reactive placement controller of the present invention can be utilized in a multi-port memory controller to enhance usage of a banked memory device. FIG. 4 is a high-level schematic diagram of the components of a multi-port memory controller 400 in accordance with one embodiment of the invention. The memory controller 400 includes an initiator block 404, a placement controller and write data queue block 406, and a DRAM command arbitration block 408. A programmable register settings block 402, which is in communication with initiator block 404, placement controller and write data queue block 406, and DRAM command arbitration block 408 also is included. The initiator block 404 is configured to receive data from port zero through port N, and is configured to arbitrate requests from the multiple ports through a feedback loop that enables the consideration of past bandwidth usage of each of the ports, that may be in addition to fairness considerations. Additional details of the initiator block 404 can be found in co-pending U.S. patent application Ser. No. 10/663,328, filed Sep. 16, 2003, and entitled "Method and Apparatus for Multi-Port Memory Controller," which is incorporated herein by reference.

In one embodiment, each of ports zero through port N is assigned a bandwidth requirement along with a priority. These values may be stored as programmable registers in programmable register setting block 402 and written upon initialization of memory controller 400 after reset. In another embodiment, the bandwidth requirement is defined as the maximum percentage bandwidth the port will be allowed to have. Once this level is exceeded, initiator block 404 is configured to no longer accept requests from the corresponding port until the bandwidth levels drop below a predefined threshold. In one embodiment, the priority of the port, along with the port arbitration logic, determines which ports are allowed to register a request to placement controller and write data queue block 406.

Figure 5:
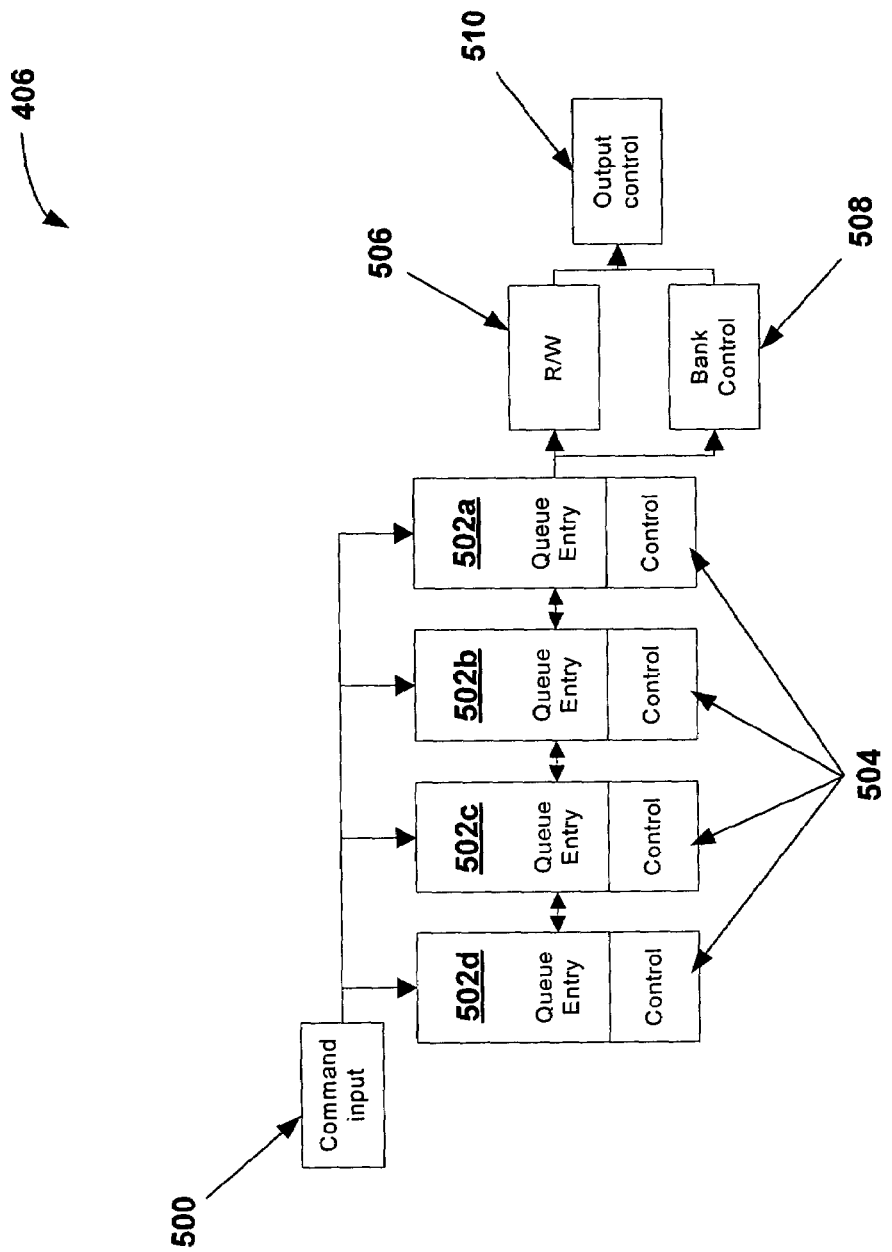
FIG. 5 is a schematic diagram showing a placement controller, in accordance with an embodiment of the present invention.

FIG. 5 is a schematic diagram showing a placement controller 406, in accordance with an embodiment of the present invention. The placement controller 406 includes a command input 500 coupled to a plurality of queue entries 502a-502d that form a queue. Each queue entry 502a-502d includes queue control logic 504, which functions to control placement of new commands from the command input 500. The top queue entry, queue entry 502a in FIG. 5, is coupled to a read/write module 506 and a bank control module 508. Finally, both the read/write module 506 and the bank control module 508 are coupled to output control module 510. In operation, the placement controller monitors all requests in the queue in order to take advantage of precharging or activating banks in the memory devices to reduce latency of commands in the command queue.

Figure 1:
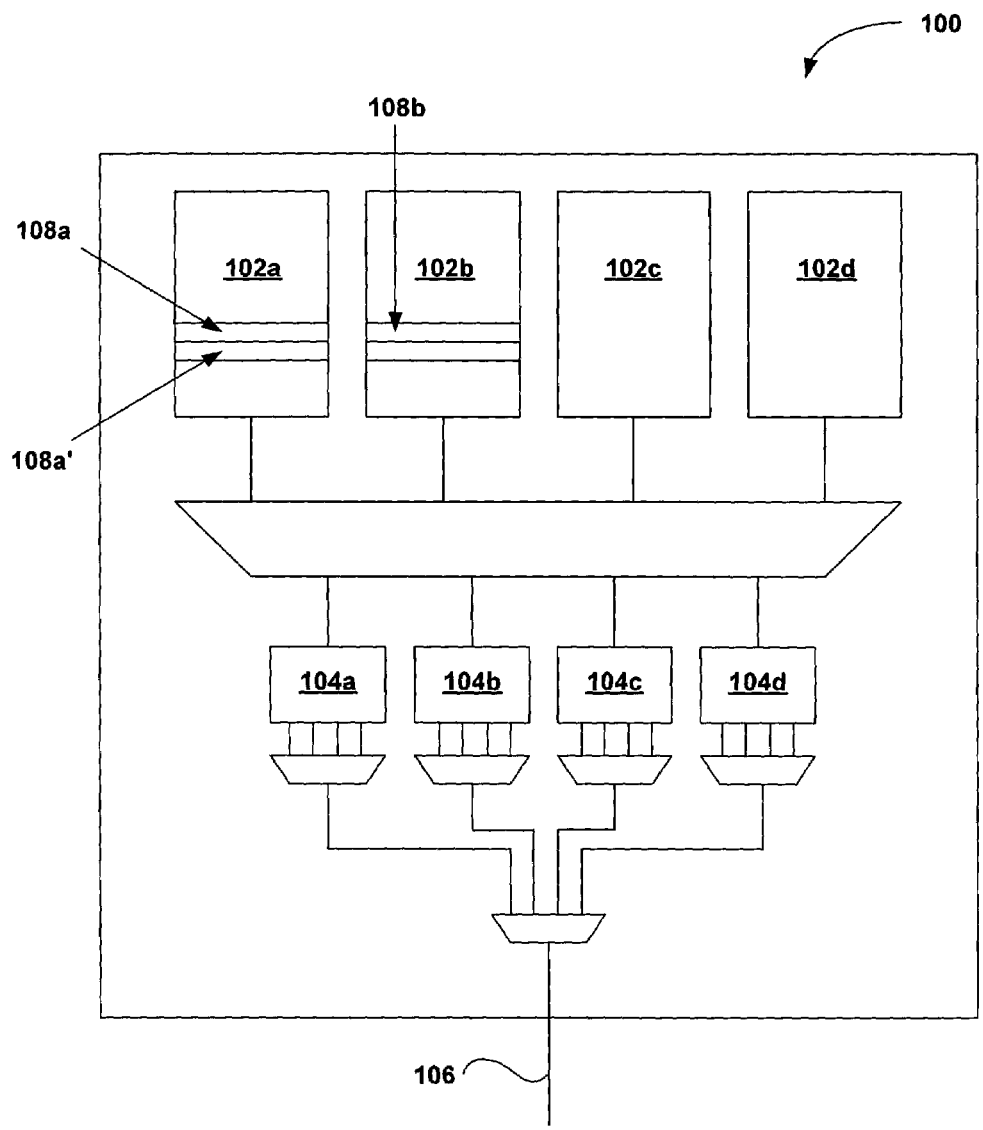
FIG. 1 is a schematic diagram showing a prior art dynamic random access memory (DRAM)
Figure 2A:
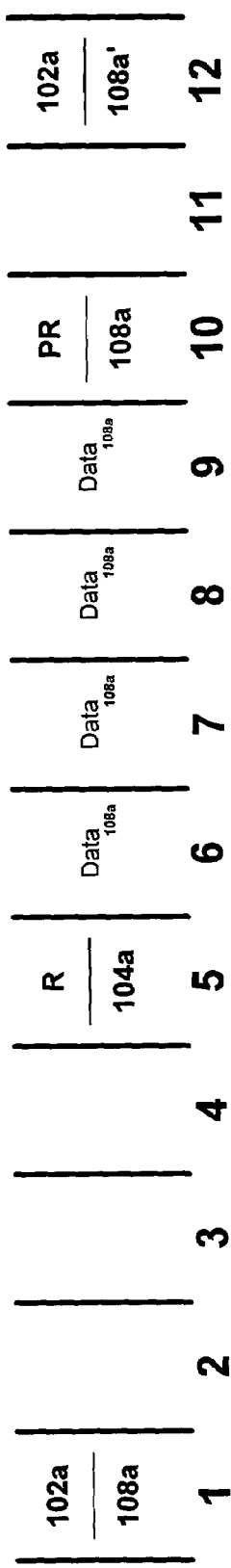
FIG. 2A is a timing diagram illustrating a prior art DRAM access of two different pages in the same memory bank.
Figure 2B:
FIG. 2B is a timing diagram illustrating a prior art DRAM access of two different pages in the same memory bank wherein an additional memory access command is inserted to increase data access efficiency.
Figure 3:
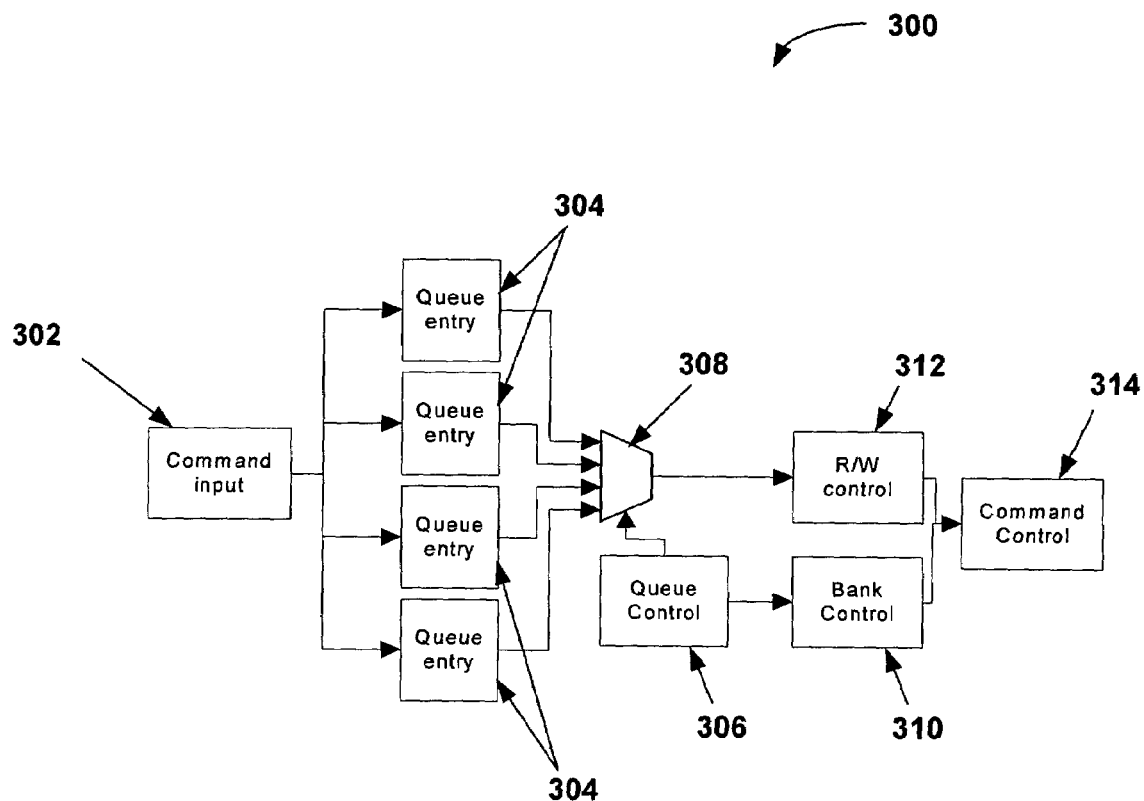
FIG. 3 is a schematic diagram showing an exemplary prior art DRAM controller for reordering memory access commands to increase DRAM efficiency.

The placement controller 406 dramatically reduces the problems of the prior art DRAM controllers discussed above with reference to FIG. 3. The placement controller 406 is based on a premise that DRAM devices should have a planed ordering in order to do bank prepping before a read/write command is actually issued.

In operation, the placement controller 406 places inbound commands into the queue entries 502a-502d based on the requirements of the command and the programmed operation of the queue control logic 504. The placement controller 406 uses a migration queue in that all commands migrate from left to right as the read/write module 506 accepts commands. As mentioned above, the far right queue entry 502a in FIG. 5 is the top of the queue. Because the top queue position is a physical position, no multiplexer is required. That is, each command will be in the top queue entry 502a before the command goes to the read/write module 506.

Timing for the read/write module 506 generally does not change as the number of queue entries 502a-502d increases because each queue entry 502a-502d only has three busses that the queue entry 502a-502d processes. In particular, each queue entry 502a-502d interfaces with the command input module 500, the previous queue entry and the next entry. For example, in FIG. 5, queue entry 502b generally is only required to interface with the command input module 500, queue entry 502a, and queue entry 502c. Moreover, the output from the top queue entry is generated from flops and therefore the queue itself does not impede on the downstream timing of the bank prediction or read/write logic stages.

Each queue entry 502a-502d advantageously includes its own queue control logic 504 to manage the particular queue entry 502a-502d. The queue control logic 504 determines on each clock cycle where to load data for the queue among the inbound busses or its own data stored in the particular queue entry 502a-502d. The queue control logic 504 also has the ability to modify the contents of the queue data to generate status information that migrates with the stored command data. The combined logic for all the queue control logic 504 in all of the queue entries 502a-502d determines where each command is placed when a new command is applied from the command input module 500. Each time a new command arrives from the command input module 500, all the queue entries 502a-502d collectivity determine what they will do with the command and where the command will be placed within the queue.

For example, in FIG. 5, if three of the four queue entries 502a-502d are full and queue entry 502b should receive the new command from the command input module 500, then the entry data for queue entry 502c is placed in queue entry 502d, entry data for queue entry 502b is placed in queue entry 502c, queue entry 502b loads the new command, and queue entry 502a keeps its own data. This all happens in the same clock cycle. When the read/write module 506 accepts a command, all the queue entries 502a-502d are shifted on the same clock cycle reducing the number of full entries by one and clearing the entry in queue entry 502d.

Because each queue entry 502a-502d can change the data in the queue entry, status or control data migrates with the command. Also, bank status migrates with the command along with an age count. If the bank status migrates with the command, higher priority commands that are placed near the front of the queue may use a bank of a command in the queue further down the queue and re-address the bank. The command further down the queue will detect that the bank was re-addressed and, when the bank lock is released, the command that was further down will again re-address the bank for its usage. A bank lock is an indication that this queue entry has been allocated use of a particular bank in memory. Each queue entry 502a-502d solves the problem of bank addressing by making sure that its bank is addressed properly at all times based on where the command is in the queue. Each queue entry 502a-502d indicates whether or not it has been allocated a bank. The bank prediction can therefore operate on all the valid queue entries at once. An age count is maintained with the command and when the age count underflows, the command's priority is made higher. This process prevents a command remaining in the queue indefinitely.

Each command is accompanied by a source ID and a priority. The source ID is utilized to keep the queue from re-ordering commands from the same source. Priority is utilized to lower the latency of the command. There is no association between the source ID and the priority. Hence, each command from any source could be at any priority. Additional details of source IDs and priority can be found in co-pending U.S. patent application Ser. No. 10/663,327, filed Sep. 16, 2003, and entitled "Port Independent Data Transaction Interface For Multi-Port Devices," which is incorporated herein by reference.

Commands of like priority are normally placed in the queue in groups. The commands of higher priority are grouped to the right of the queue, with lower priority commands grouped to the left of the queue. Within each priority group, read commands are grouped together and write are grouped together. Within each grouping of reads, and writes, commands to the same bank with a different row (page) are separated with other commands. This layered approach will be referred to hereinafter as "brackets" or "bracketing."

In one embodiment, the brackets utilized are 1) priority—to control the latency of the command, 2) read/write—to increase bandwidth because reads can be chained, and 3) bank split—to increase bandwidth by lowering bank overhead. In the placement controller 406, each bracket is a soft division of the queue. The entire queue may have all different priorities or all the same priority. Because each queue entry 502a-502d has its own queue control logic 504 for detecting the above conditions, with control flags, each of the conditions can be easily disabled providing for a large degree of control of how commands in the queue are grouped.

Figure 6:
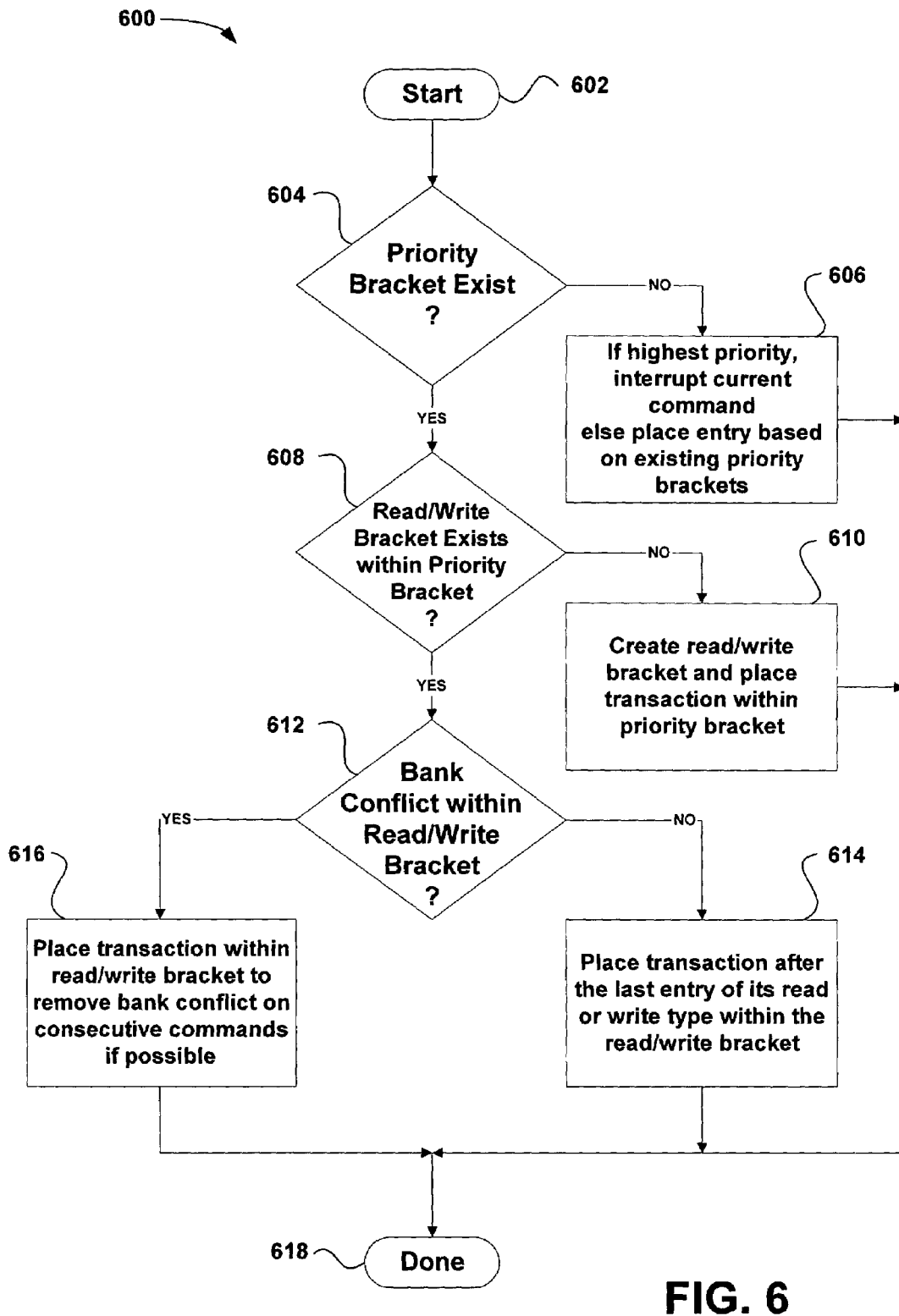
FIG. 6 is a flowchart showing a method for placing commands within the queue of the placement controller, in accordance with an embodiment of the present invention.

FIG. 6 is a flowchart showing a method 600 for placing commands within the queue of the placement controller, in accordance with an embodiment of the present invention. In an initial operation 602, preprocess operations are performed. Preprocess operations can include arbitrating requests from multiple ports, assigning a source ID and priority to the command, and other preprocess operations that will be apparent to those skilled in the art after a careful reading of the present disclosure.

Once a command is received, the command's priority is examined, in operation 604. If a priority bracket for the command's priority currently exists within the queue, the method 600 continues to operation 608. Otherwise, the method 600 branches to operation 606.

In operation 606, the priority of the command is examined to determine if the command's priority is the highest priority in the queue. If an incoming command is of highest priority in the command queue, this command interrupts the current command and executes immediately. The interrupted command resumes processing after the higher priority command completes or when there are no more interrupting high priority commands. If an incoming command is not the highest priority in the command queue, the command is placed in the queue based on the existing brackets within the queue. As mentioned above, higher priority commands are placed ahead of lower priority commands. In one embodiment, if a high priority request detects a data coherency issue, all commands previously in the queue ahead of the command that caused the coherency violation are executed before the new high priority command regardless of their priority.

In operation 608, a decision is made as to whether a read/write bracket exists within the priority bracket for the new command. If a read/write bracket exists within the priority bracket for the new command, the method 600 continues with operation 612. Otherwise, the method 600 branches to operation 610.

In operation 610, a read/write bracket is created based on the type of the new command (read or write) and the new command is placed within the priority bracket. Commands with like priorities are placed such that read commands are grouped with read commands and write commands are grouped with write commands. The order of the read verses write grouping is determined by the order in which the commands are sent to the placement controller. For example, if a read command at a particular priority is accepted before a write command at the same priority, the read commands will be placed ahead of write commands. On the other hand, if the write command is accepted before the read command, the write commands will be ahead of the read commands for that particular priority level.

A decision is then made as to whether the new command causes a bank conflict within the read/write bracket, in operation 612. If the new command causes a bank conflict within the read/write bracket, the method 600 branches to operation 616. Otherwise, the method 600 continues with operation 614.

When the new command causes a bank conflict within the read/write bracket, the new command is placed within the read/write bracket so as to remove the bank conflict on consecutive commands if possible, in operation 616. As mentioned above, a bank conflict occurs when consecutive commands attempt to access different pages (rows) within the same memory bank. Hence, embodiments of the present invention place commands with like priorities and the same read or write types such that bank collisions are avoided in the memory device.

When the new command does not cause a bank conflict within the read/write bracket, the command is placed after the last entry of the command's read or write type within the read/write bracket, in operation 614. Post process operations are performed in operation 618. Post process operations can include, for example, moving data from a memory bank to a page holder, precharging the memory banks, and other post process operations that will be apparent to those skilled in the art after a careful reading of the present disclosure.

In one embodiment of the present invention, additional conditions can be utilized to enhance the placement method 600 described above. For example, in one embodiment, if a read or write command is to the same DRAM page as a previously placed transaction in the queue, the new command is placed behind the command to the same DRAM page. The exact placement of the new command is based upon the general placement method 600 for all the commands that are currently behind the command with the matching DRAM page. The new command retains all the priority information when placed, allowing all subsequent commands to be placed in accordance with the placement method 600.

In one embodiment, all read commands from a particular source ID are always executed in the order they are received by the placement controller. In this embodiment, write commands from a particular source ID are also executed in the order they are received by the placement controller. The placement controller can place read commands ahead of write commands and vice versa as long as there is no data coherency issue. If a new read or write command has the same source ID and a greater priority as the current read or write command respectively in the queue, the new command is placed after the current command. The new command retains all the priority information when placed.

Figure 7:
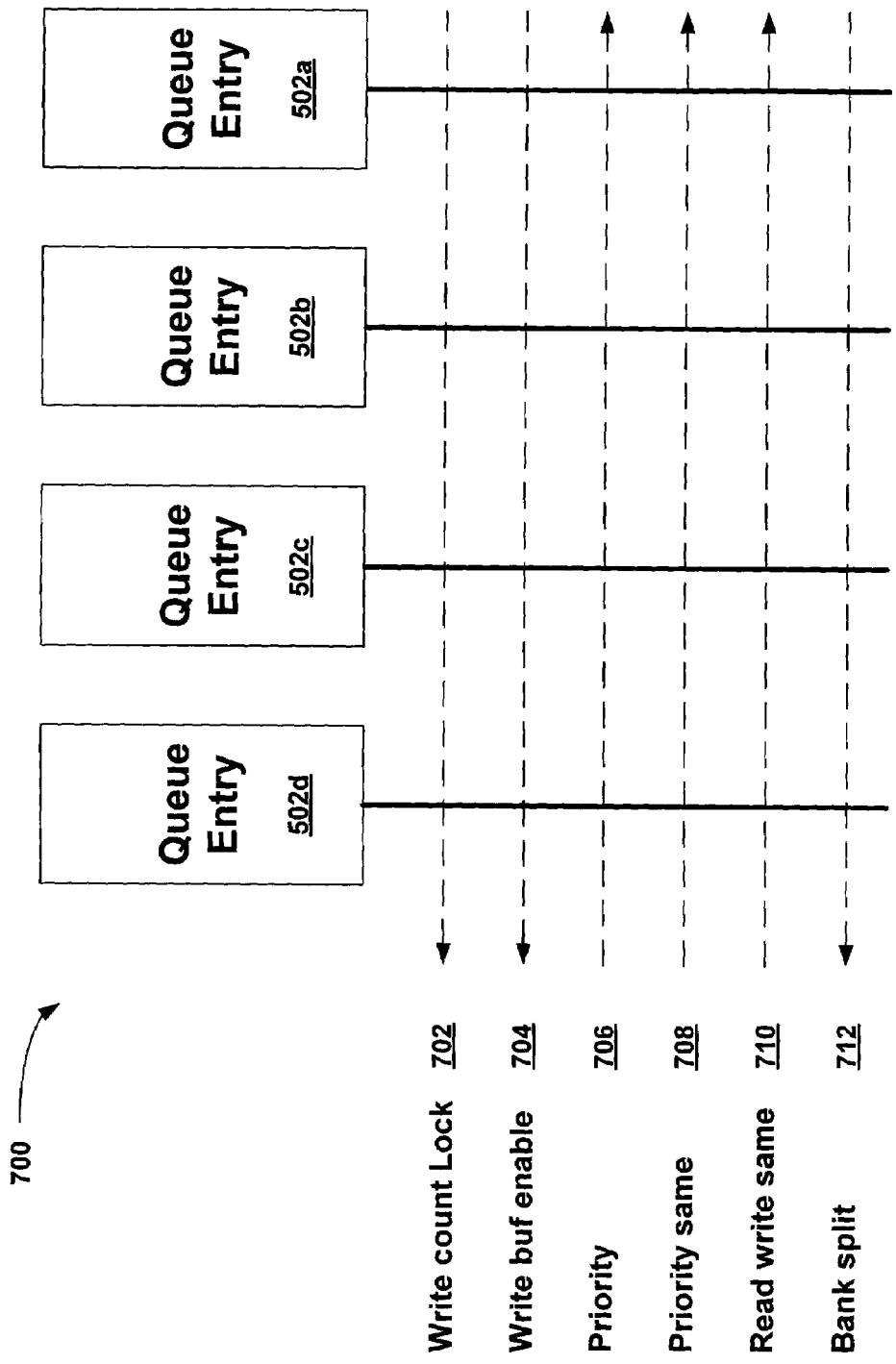
FIG. 7 is a schematic diagram of priority chains, in accordance with an embodiment of the present invention.

FIG. 7 is a schematic diagram of priority chains 700, in accordance with an embodiment of the present invention. In particular, FIG. 7 illustrates how priority chains interact with the queue entries 502a-502d to determine the placement of new commands. A priority chain is a series of AND gates in a chain utilized to disable lower priority queue entries by higher priority queue entries. The priority chains 700 illustrated in FIG. 7 include a write count lock priority chain 702, a write buffer enable priority chain 704, a "Priority" priority chain 706, a Priority same priority chain 708, a read/write same priority chain 710, and a bank split priority chain 712.

It should be noted that a priority chain is different than the priority assigned to a particular command. That is, the priority of a command is a value assigned to a command when the command is sent to the placement controller and is part of the total command sent. While a priority chain, as mentioned above, is a series of gates used to disable particular queue entries from accepting new commands or shifting its command towards the head of the queue.

As shown in FIG. 7, each queue entry 502a-502d has an output to, and input from, each priority chain 702-712. The direction of arrows on the priority chain 702-712 indicate in which direction following queue entries 502a-502d will be affected by a particular queue entry. For example, in the "Priority" priority chain 706, the output of queue entry 502d affects all the other queue entries 502a-502c, queue entry 502c affects queue entries 502b and 502a, queue entry 502b affects only queue entry 502a, and queue entry 502a does not affect any other queue entry on the "Priority" priority chain 706. We define the "Priority" priority chain 706 as going forward or going in the direction of standard commands. On the other hand, the Bank split priority chain 712 goes in the reverse direction such that the output of queue entry 502a affects all other queue entries 502b-502d.

The "Priority" priority chain 706 is controlled by the command priority of the command in each queue entry 502a-502d and the new inbound command from the command input module. If the priority of the command in a particular queue entry 502a-502d is higher than the priority of the new inbound command, the "Priority" priority chain 706 is disabled at that queue entry. For example, if queue entry 502c detects that the command in queue entry 502c has a higher priority than the new inbound command, queue entry 502c will disable queue entry 502b and queue entry 502a by disabling the "Priority" priority chain 706 at queue entry 502c.

To further explain this, if queue entry 502c detects that the new inbound command needs to be placed at this point, queue entry 502c disables the entries below by disabling the "Priority" priority chain 706, which disables queue entries 502b and 502a, and accepts the new command. Queue entry 502d knows that it needs to load the new command in queue entry 502c because queue entry 502d is not disabled. Queue entry 502b and queue entry 502a know not to do anything because they are disabled. In this instance, queue entry 502d receives a "1" from the "Priority" priority chain 706, queue entry 502c also receives a "1," and queue entries 502b-502a each receive a "0" from the "Priority" priority chain 706. Each queue entry 502a-502d receives a slightly different value from the "Priority" priority chain 706 depending upon the conditions of the inbound command and the particular data stored in the queue entries 502a-502d. The remaining priority chains 702-704 and 708-710 have similar functions, the difference being the data that disables the priority chains.

In particular, the "Priority" priority chain 706 is dependent upon the priority of a command being higher than the priority of the command stored in the queue entry 502a-502d. The Priority same priority chain 708 is dependent upon the priority of a command being the same as the priority of the command stored in the queue entry 502a-502d. The Read write same priority chain 710 is dependant upon both the priority of the command and the type of the command being the same as the command stored in the queue entry 502a-502d. The Bank split priority chain 712 is dependant upon both the priority of the command and the type of the command being the same with a bank conflict between this entry and the next entry.

The "Priority" priority chain 706 is utilized to detect new priority levels. The Priority same priority chain 708 is used to detect and append to current priority levels. The Read write same priority chain 710 is used to detect and append to read and write brackets at the same priority level. The Bank split priority chain 712 is used to detect the information to place commands between commands that would otherwise have large overhead by using the same bank with different row (page). The Write buf enable priority chain 702 is used for collision detection of write buffers for write commands, and the write count lock priority chain 704 is used to coordinate access of two commands using the same write buffer in sequence. Because of the priority chains 702-712, each queue entry 502a-502d receives all the information necessary to make a decision as to where to load data for each queue entry 502a-502d.

As mentioned above, the command stored in the top queue entry, in FIG. 7 queue entry 502a, is the next command that will be loaded into the read/write module for processing. Loading the command from the top queue entry into the read/write module is referred to as a "dequeue." Depending on whether a dequeue occurs when a new command is received, different data movement can occur within the queue. For example, suppose a new command is received and a dequeue does not occur during that clock cycle. In addition, suppose the new command should be inserted into queue entry 502b and that commands are currently stored in queue entries 502a, 502b, and 502c. In this case the number of commands stored in the queue is increased by one. Queue entry 502d loads the command data stored in queue entry 502c, queue entry 502c loads the command data stored in queue entry 502b, queue entry 502b loads the new inbound command, and queue entry 502a does nothing, keeping its current command data.

In another example, suppose a new command is received and a dequeue occurs during the same clock cycle. As above, suppose the new command should be inserted into queue entry 502b and that commands are currently stored in queue entries 502a, 502b, and 502c. In this case the number of commands does not change. Queue entry 502d and queue entry 502c do nothing, keeping their current command data. Queue entry 502a loads the command data stored in queue entry 502b, and queue entry 502b loads the new inbound command.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A reactive placement controller for interfacing with a banked memory storage, comprising:
    a read/write module coupled to a command control module for a banked memory device;
    a command queue including a plurality of queue entries coupled in series, the plurality of queue entries including a top queue entry coupled to the read/write module, each queue entry capable of storing a memory command; and
    priority chains including a plurality of AND gates in a chain, the priority chains capable of allowing higher priority queue entries to disable lower priority queue entries,
    wherein each queue entry includes queue control logic that functions to control storage of new memory commands into the command queue to reduce latency of commands in the command queue.

2. A reactive placement controller as recited in claim 1, wherein the queue control logic for each queue entry groups new inbound commands into brackets, wherein each bracket is a soft division of the command queue based on command data.

3. A reactive placement controller as recited in claim 2, wherein the queue control logic for each queue entry groups new inbound commands into priority brackets based on a priority value of the command.

4. A reactive placement controller as recited in claim 2, wherein the queue control logic for each queue entry groups new inbound commands into read/write brackets based on a priority value of the command and a type of the command.

5. A reactive placement controller as recited in claim 4, wherein read commands are grouped with read commands and write commands are grouped with write commands.

6. A reactive placement controller as recited in claim 2, wherein the queue control logic for each queue entry groups new inbound commands into bank split brackets based on a priority value of the command, a type of the command, and bank collision proximity to other commands in the command queue.

7. A reactive placement controller for interfacing with a banked memory storage, comprising:
    a read/write module coupled to a command control module for a banked memory device; and
    a command queue including a plurality of queue entries coupled in series, the plurality of queue entries including a top queue entry coupled to the read/write module, each queue entry capable of storing a memory command,
    wherein each queue entry is coupled to a plurality of priority chains, each priority chain including a plurality of AND gates in a chain, the priority chains capable of allowing higher priority queue entries to disable lower priority queue entries.

8. A reactive placement controller as recited in claim 7, wherein the plurality of priority chains includes a "Priority" priority chain that is controlled by a command priority value of commands, and wherein the "Priority" priority chain is capable of disabling queue entries storing commands having a higher priority than a new inbound command.

9. A reactive placement controller as recited in claim 7, wherein the plurality of priority chains includes a Priority same priority chain that is controlled by a command priority value of commands, and wherein the Priority same priority chain is capable of disabling queue entries storing commands having a different priority than a new inbound command.

10. A reactive placement controller as recited in claim 7, wherein the plurality of priority chains includes a read write same priority chain that is controlled by a command type value of commands, and wherein the read write same priority chain is capable of disabling queue entries storing commands having a different command type than a new inbound command.

11. A reactive placement controller as recited in claim 7, wherein the plurality of priority chains includes a bank split priority chain that is controlled by a address value of commands, and wherein the bank split priority chain is capable of disabling queue entries storing commands causing a bank conflict between adjacent queue entries.

12. A reactive placement controller as recited in claim 7, wherein the plurality of priority chains includes a write buf enable priority chain that is capable of collision detection of write buffers for write commands.

13. A reactive placement controller as recited in claim 7, wherein the plurality of priority chains includes a write count lock priority chain that is capable of coordinating access of two commands using a same write buffer in sequence.

* * * * *